United States Patent
Gaultier

(10) Patent No.: US 6,647,527 B2
(45) Date of Patent: Nov. 11, 2003

(54) METHOD OF COMMUNICATION WITH IMPROVED ACKNOWLEDGMENT OF RECEPTION

(75) Inventor: Jean-Marie Gaultier, Rousset (FR)

(73) Assignee: STMicroelectronics S.A., Montrouge (FR)

( * ) Notice: Subject to any disclaimer, the term of this patent is extended or adjusted under 35 U.S.C. 154(b) by 16 days.

(21) Appl. No.: 10/097,785

(22) Filed: Mar. 14, 2002

(65) Prior Publication Data

US 2002/0095637 A1 Jul. 18, 2002

Related U.S. Application Data

(63) Continuation of application No. 09/234,131, filed on Jan. 15, 1999, now Pat. No. 6,393,595.

(30) Foreign Application Priority Data

Jan. 16, 1998 (FR) .............................. 98 00450

(51) Int. Cl.⁷ .......................... G08C 25/02; H04L 1/18; G06F 11/10; H03M 13/00
(52) U.S. Cl. ...................... 714/748; 714/807
(58) Field of Search .............. 714/746, 747, 714/748, 749, 750, 751, 807

(56) References Cited

U.S. PATENT DOCUMENTS

| | | | |
|---|---|---|---|
| 3,979,719 A | 9/1976 | Tooley et al. | 714/748 |
| 4,439,859 A | 3/1984 | Donnan | 714/748 |
| 4,543,628 A | 9/1985 | Pomfret | 714/15 |
| 4,597,082 A | 6/1986 | Hill et al. | 714/748 |
| 4,691,314 A | 9/1987 | Bergins et al. | 370/471 |
| 4,841,526 A | 6/1989 | Wilson et al. | 714/743 |
| 5,031,179 A | 7/1991 | Yoshida et al. | 714/748 |
| 5,297,143 A | 3/1994 | Fridrich et al. | 370/445 |
| 5,490,153 A | 2/1996 | Gregg et al. | 714/748 |
| 5,938,786 A | 8/1999 | Gregg | 714/748 |
| 6,084,966 A | 7/2000 | Maebara et al. | 380/43 |
| 6,393,595 B1 * | 5/2002 | Gaultier | 714/748 |

FOREIGN PATENT DOCUMENTS

GB    1 428 050    3/1976

OTHER PUBLICATIONS

Carlson, D.E. "Bit–Oriented Data Link Control Procedures", IEEE Transactions on Communications, vol. COM–28, No. 4, Apr. 4, 1980, pp. 455–467, XP–002077256.

Hayshida, Y et al. "Go–Back–N System with Limited Retransmissions", Proceedings of the Annual International Phoenix Conference on Computers and Communications, Mar. 22–24, 1989, pp. 183–187, XP–000040917.

(List continued on next page.)

Primary Examiner—Phung M. Ohung
Assistant Examiner—Joseph D. Torres
(74) Attorney, Agent, or Firm—Lisa K. Jorgenson; Stephen Bongini; Fleit, Kain, Gibbons, Gutman & Bongini P.L.

(57) ABSTRACT

A method for communicating between a transmitting unit and a receiving unit over a synchronous serial link. A messages formed by elementary messages is transmitted from the transmitting unit to the receiving unit, with each of the elementary messages including a useful information word. There is established a time gap composed of multiple elementary temporal units after each elementary message is transmitted by the transmitting unit, with the transmitting unit not transmitting during the time gap. During the time gap, an acknowledgement word is received from the receiving unit. The acknowledgement word includes at least one reception bit that is selectively positioned at one of the elementary temporal units of the time gap, and the transmitting unit determines the elementary message that is to be transmitted next based at least partially on at which elementary temporal unit of the time gap the received at least one reception bit is positioned.

22 Claims, 3 Drawing Sheets

OTHER PUBLICATIONS

Yasui, K. et al., "An Automatic–Repeat Request Policy for a Data Transmission System with Three Types of Error Probabilities", Electonics & Communications in Japan, Part III—Fundamental Electronic Science, vol 70, No. 4, Apr. 1, 1996, pp. 43–51, XP–000621236.

French Search Report dated Sep. 14, 1998 with annex to French Application No. 9800450.

Wicker, Stephen B., "Error Control Systems for Digital Communication and Storage," Prentice–Hall 1995.

* cited by examiner

METHOD OF COMMUNICATION WITH IMPROVED ACKNOWLEDGMENT OF RECEPTION

CROSS-REFERENCE TO RELATED APPLICATIONS

This is a continuation of U.S. application Ser. No. 09/234,131, filed Jan. 15, 1999, now U.S. Pat. No. 6,393,595. The entire disclosure of prior application Ser. No. 09/234,131 is herein incorporated by reference.

Additionally, this application is based upon and claims priority from prior French Patent Application No. 98-00450, filed Jan. 16, 1998, the entire disclosure of which is herein incorporated by reference.

BACKGROUND OF THE INVENTION

1. Field of the Invention

The present invention relates to digital transmission, and more specifically to an efficient method for communicating between master and slave units by using a protocol having improved acknowledgment during message reception.

2. Description of Related Art

Digital transmissions can be made by means of different media. The transmission channels may indeed be either wire links, optical fibers, or a volume of air between two antennas. FIG. 1 shows an example of communication using RF links. As shown, a master unit 1 uses a transceiver antenna 11 to exchange messages with a slave unit 2 having a transceiver antenna 22. The transmission channel is formed by the volume of air between the two antennas 11 and 22. Each of the master unit and the slave unit can transmit messages to the other unit and receive messages from the other unit. The master unit is distinguished from the slave unit in that the master unit takes the initiative in the communication. For example, the master unit can be the central processing unit of a computer, and the slave unit can be one of its peripherals such as a printer that is remote-controlled by means of any transmission channel.

There are conventional methods of communication that consist of transmitting messages that include a useful information word and one or more service bits. The transmission is carried out serially according to a specified communications protocol. A protocol of this kind specifies the format and the syntax of the messages that are transmitted by the master unit to the slave unit or vice versa. The transmission is done synchronously, and is sequenced at a specified rate with the units including conventional circuitry to lock in to the rate the same clock or two synchronous or dia-synchronous clocks.

FIG. 2 shows an example of a conventional elementary message format. The elementary message begins with a starting bit START whose function is to synchronize the clock of the addressed unit with the received message. Then, the message includes an encoded useful information word INFO (e.g., encoded in eight bits or one byte). This word may be an instruction word whose value indicates the nature of a command to be carried out by the addressed unit. For example a read or write command. Alternatively, it could be an address word whose value indicates the address (or a part of the address) of a memory location of the addressed unit at which a data element is to be read or written. Additionally, the word can be a data word whose value indicates the value of a data element processed by the addressed unit.

The elementary message also includes a check bit CHECK such as a parity check bit. The value of the parity check bit CHECK is fixed at the logic value 1 or 0, and is determined in such a way that the sum of the values of the bits of the useful information INFO gives an even value or an odd value depending on the chosen type of parity. The role of the parity check bit CHECK is to enable the addressed unit to detect any transmission errors. In such a case, the addressed unit can request a re-transmission of the message.

The conventional message ends with an end-of-transmission bit STOP that is used solely to indicate the end of the message. Following the end-of-transmission bit STOP, each protocol generally provides for a number of elementary temporal units during which the sending unit no longer sends any bit on the transmission channel. Thus, the transmission channel is left free so that the addressed unit can send a bit ACK to acknowledge the communication. The logic value of the acknowledgment bit indicates whether the message has been accurately received. The circuitry conventionally used to determine whether the message has been accurately received is the check performed by means of the parity check bit CHECK. In FIG. 2, four such elementary temporal units follow the bit STOP, with one of these temporal units being occupied by the reception acknowledgment bit ACK.

There presently exists a very large quantity of different communication protocols for electronic systems. Each protocol is suited to the specific constraints of a specific application (such constraints including the size of the words to be transmitted, coherence checks, the need to securitize communications against passive or active intervention by ill-intentioned individuals, constraints related to acknowledgment mode, and maximum duration of transmission in relation to the bit rate). Within one system, the master unit and the slave unit obviously conform the same communications protocol so that they can communicate with each other intelligibly.

In general, the information on the communications protocols developed by electronics systems manufacturers is widely disseminated in order to enable other manufacturers to incorporate these systems into more complex assemblies or develop new industrial and/or commercial applications. Thus, with respect to the size of the communications in which such protocols are used, the integrity of the information transmitted and the efficiency of the transmission has to be the optimum. In other words, it is necessary for the transmission to be affected by a minimum of errors. Furthermore, there are applications in which the integrity of the information exchanged and the efficiency of communication are major constraints in the specifications. Conventionally, quality control of the transmission of the binary signals lies essentially in the analysis and interpretation of the value of the parity check bit CHECK described above.

FIGS. 3A and 3B show two possible cases to illustrate the determining of the parity bit CHECK. In these examples, the message format of FIG. 2 is used. In the figures, no special attention has been paid to the values of the starting bit START and end-of-transmission bit STOP. All that has been taken into account is the values of the bits of the useful information word INFO, the parity check bit CHECK, and the acknowledgment bit ACK. FIG. 3A shows the case of a useful information word INFO1 whose transmission has not been erroneous. The logic value 1 is illustratively given to the first seven bits B1, B2, B3, B4, B5, B6, and B7 of the useful information word INFO1, and the last bit B8 of the useful information word INFO1 is set at the logic value 0.

If an "even" type of parity is used, the parity check bit CHECK will then take the logic value 1. That is, the sum of the values of the eight bits of the useful information word INFO1 added to the value of the parity bit CHECK gives the number 8 in conformity with even parity. In the case of FIG. 3A, the transmission of the useful information word INFO1 is not affected by errors so the useful information word INFO2 that results from the transmission of the useful information word INFO1 consequently has the same binary values for each of the bits. In general, a circuit formed by elementary logic gates is used to ascertain that the result of the transmission of the useful word is in conformity with the expected result with respect to the value of the received parity check bit and the type of parity adopted. Thus, as shown in FIG. 3A, the acknowledgment bit has the value that indicates accurate reception. (In FIGS. 3A and 3B, accurate acknowledgment illustratively corresponds to a value 1 of the acknowledgment bit ACK.)

FIG. 3B shows a case with the same useful information word INFO1, but for a transmission error. A useful information word INFO3 is received in the reception unit following the transmission of the useful information word INFO1. In FIG. 3B, the eighth bit B8 of the received useful information word INFO3 is different from the eighth bit of the transmitted useful information word INFO1. Thus, the transmission has been erroneous and the useful information word INFO3 no longer matches with the parity check bit CHECK. The same result would occur if three, five, or seven of the eight bits constituting the received useful information word INFO3 had been different from the bits of the transmitted useful information word INFO1. Indeed, in all these cases, the sum of the eight bits of the useful information word INFO3 added to the value of the parity check bit CHECK gives an odd number while the type of parity is even parity. Consequently, in FIG. 3B, the acknowledgment bit ACK has the value 0.

The transmission of a message includes three or four phases of reception and transmission depending on whether the operation is in read mode or in write mode. The order of these phases is important. For example, for a write operation, a sequence for the transmission of a message can be subdivided for example into four phases of transmission that correspond, for each phase, to the transmission of an elementary message containing a useful information word of a different type. In write mode, the first transmission phase is the transmission of a code pertaining to an instruction to be performed, and the second transmission phase is the transmission of the least significant bits of the memory address at which it is sought to write a data element. The third transmission phase is a transmission of the most significant bits of the same memory address, and the fourth transmission phase is a transmission of the bits constituting the data element to be written at the memory address.

For a read operation, a sequence for the transmission of a message can be subdivided into three phases of transmission that correspond, for each phase, to the transmission of an elementary message containing a useful information word of a different type. The three transmission phases are the three first phases described above for a write operation. Conventionally, when an error is detected by a test relating to the parity check bit, the transmission sequence is resumed at the first transmission phase of the message, regardless of the current transmission phase. Thus, even if earlier phases of the transmission have been accurately acknowledged, such transmission phases must be undertaken again as part of the entire transmission process. This lowers the efficiency of the transmission.

SUMMARY OF THE INVENTION

In view of these drawbacks, it is an object of the present invention to remove the above-mentioned drawbacks and to provide an acknowledgment of reception that enables a retransmission of the current phase of the transmission sequence. A counter is provided that can be used to count the number of retransmissions of one and the same transmission phase. At the end of a predetermined number of re-transmissions of the same phase of the transmission sequence, the counter is reset and the transmission sequence is again performed starting from the first transmission phase.

One embodiment of the present invention provides a method for communicating between a transmitting unit and a receiving unit. According to the method, a messages formed by elementary messages is transmitted from the transmitting unit to the receiving unit, and at least one reception bit is transmitted from the receiving unit to the transmitting unit. The reception bit (or bits) allows the transmitting unit to determine the elementary message that is to be transmitted next. Thus, an improvement is introduced into the protocol to determine the following transmission phase in a transmission sequence. In a preferred method, at least two reception bits are transmitted from the receiving unit and the values of the reception bits indicate the elementary message that is to be transmitted next by the transmitting unit.

Another embodiment of the present invention provides a receiving device for receiving messages from a transmitting device. The receiving device includes an interface for receiving a transmitted message from the transmitting device, means for analyzing a received elementary message to determine if it was properly received, and a transmitter for transmitting at least one reception bit to the transmitting device. The reception bit (or bits) indicates the elementary message that is to be transmitted next by the transmitting unit. In one preferred embodiment, the transmitter transmits at least two reception bits whose values indicate the elementary message that is to be transmitted next by the transmitting unit.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Preferred embodiments of the present invention will be described in detail hereinbelow with reference to the attached drawings.

Figure 1:
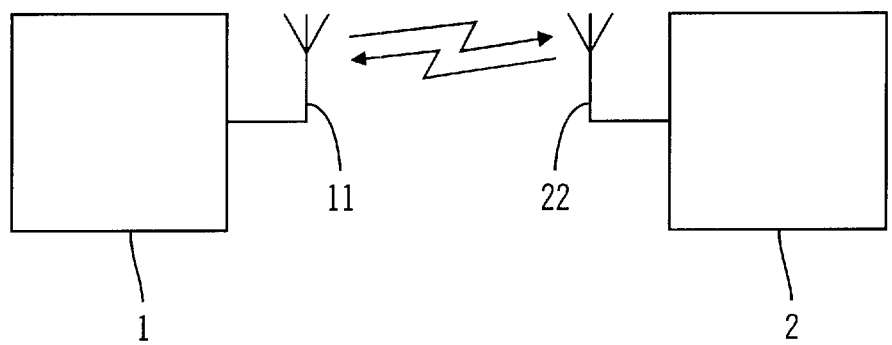
FIG. 1 is a block diagram showing a master unit and a slave unit that can exchange messages.
Figure 2:
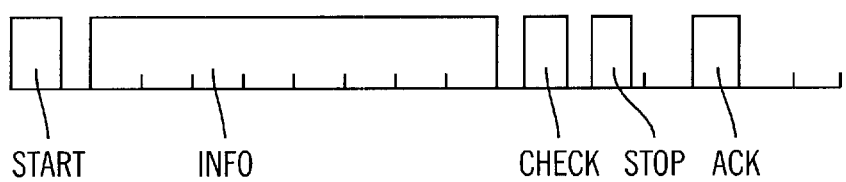
FIG. 2 is a diagram showing a conventional format for an elementary message.
Figure 3A:
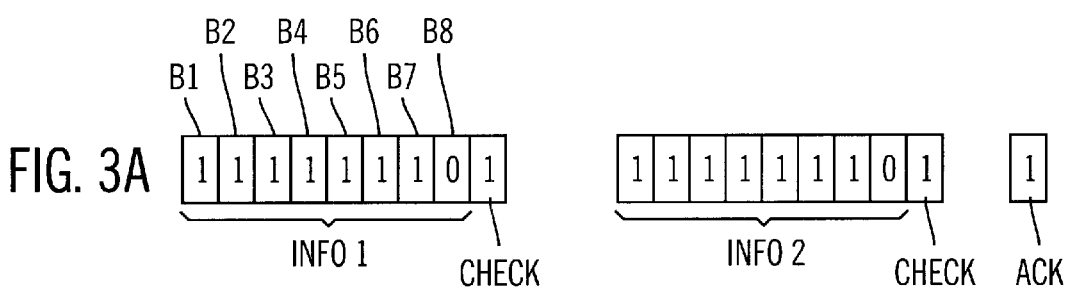
FIGS. 3A and 3B are diagrams showing exemplary messages that illustrate the function of a parity check bit.
Figure 3B:
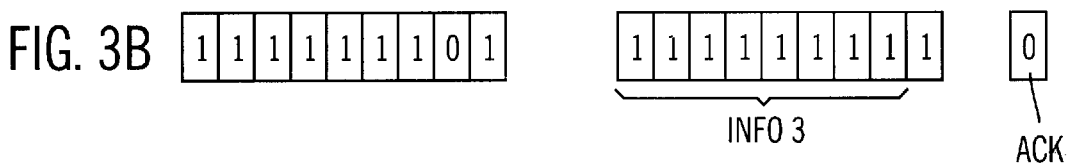

As described above with respect to FIG. 2, after transmission of a stop bit, the conventional protocols generally provide for a number of elementary temporal units during which a transmission unit no longer sends out any bits on the transmission channel. The transmission channel is thus left free so that the addressed unit can send a communications acknowledgment bit. Depending on the logic value of the acknowledgment bit, the transmitted elementary message is considered as having been accurately or erroneously received. In the former case, the operation proceeds to the next phase of the message sending sequence. On the other hand, in the latter case, the entire initial sequence of the message must be repeated under the conventional protocols.

The present invention presents an improvement in the role of the acknowledgment bit that cause the transmission unit either to transmit the next phase of the message transmission sequence, to re-transmit the last transmitted phase of the message transmission sequence, or to re-transmit the entire message transmission sequence. In a first embodiment of the present inventions, the value of the acknowledgment bit ACK and its position in the elementary temporal units left free by the transmission unit is taken into account. The acknowledgment bit is then the carrier of a piece of information whose content is greater than a binary piece of information.

Figure 4:
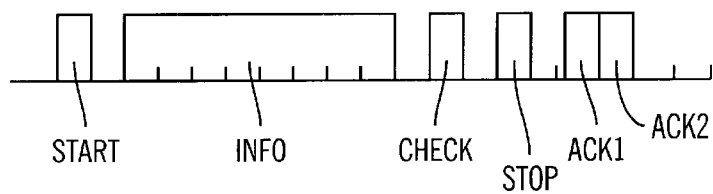
FIG. 4 is a diagram showing a format for an elementary message according to one embodiment of the present invention.

The elementary message format according to another embodiment of the present invention is shown in FIG. 4. This elementary message format corresponds to the conventional format shown in FIG. 2 except that each message has two reception acknowledgment bits ACK1 and ACK2. The two bits ACK1 and ACK2 form a reception acknowledgment word MACK and each elementary message is therefore provided with two acknowledgment bits forming an acknowledgment word. Consequently, the acknowledgment word may convey an information element whose content is greater than a simple binary piece of information. These messages make it possible to inform the transmission unit about the phase of the message transmission sequence that has to be sent.

Figure 5:
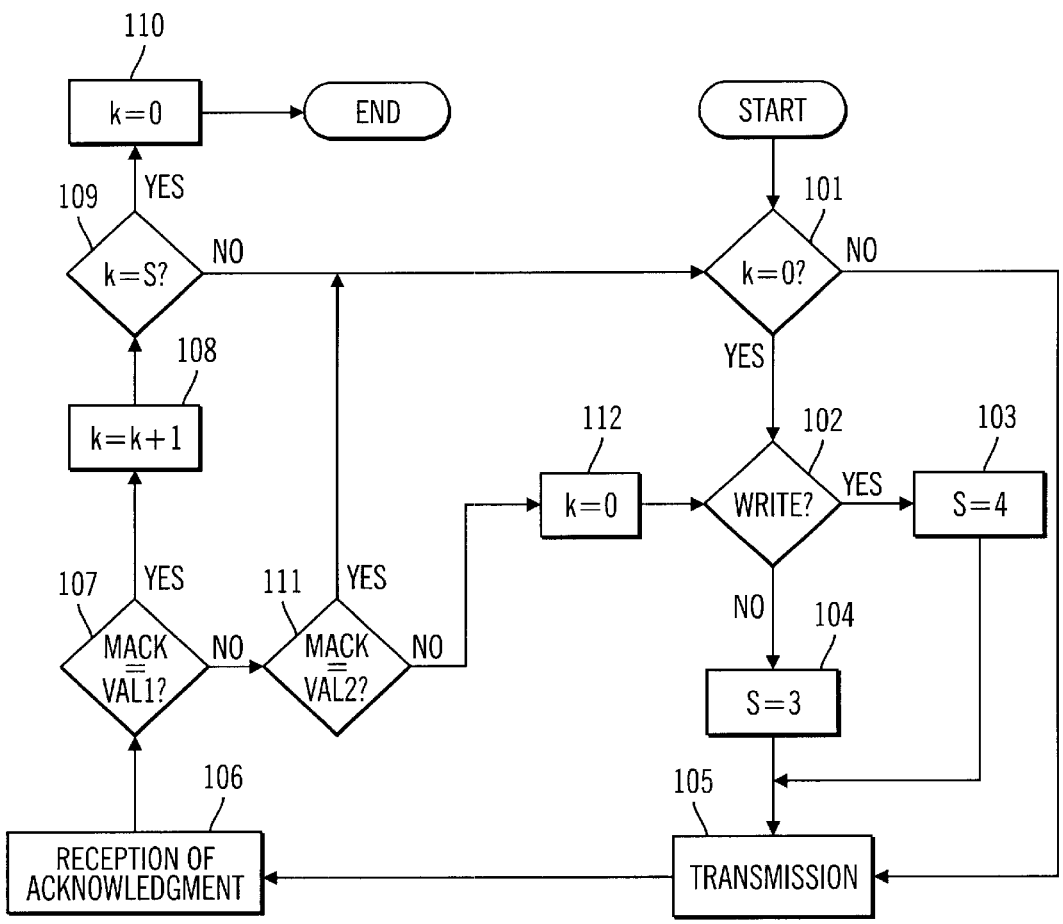
FIG. 5 is a flow chart showing a process for sending a message according to a preferred embodiment of the present invention.

FIG. 5 shows a flow chart for sending a message according to a preferred embodiment of the present invention. In FIG. 5, a letter k designates an index that can assume a value from 0 to 4 to signify the current phase of the transmission sequence, a letter S always determines the phase number in the transmission sequence, and the values VAL1, VAL2, and VAL3 designate the different values that can be assumed by the acknowledgment word MACK. In particular, the value VAL1 means that the reception has been properly acknowledged with respect to the parity check bit, the value VAL2 means that the reception has not been properly acknowledged with respect to the parity check bit but that it is desired to resume the transmission sequence at the current phase of the transmission sequence (i.e., so the last elementary message can be sent again), and the value VAL3 corresponds to the value assumed by the acknowledgment word when the reception has not been accurately acknowledged and when it is desired to resume transmission from the first phase of the message transmission sequence.

As shown, in a first step 101 after the beginning of the program, a test is performed to determine if the operation is in the first phase of the transmission sequence. The value of k is then 0. If the answer is yes, then the useful information word is a control instruction. Then, a test 102 allows, through a decoding of the bits of the useful information word, to determine whether the useful information word corresponds to a write instruction. If the answer is yes, then in a step 103, the natural integer S assumes the value 4. If the answer is no (i.e., if the instruction is a read command), then in step 104, the natural integer S assumes the value 3.

Once the number of phases of the transmission sequence has been determined, the message is effectively transmitted in step 105. Following step 105, step 106 consists of the reception of the acknowledgment word MACK. Then, in step 107 the value of the word MACK, is used to determine whether the last transmission has been accurately acknowledged by the reception unit. If the transmission has been accurately acknowledged by the reception unit, the index k is incremented by one unit in the step 108. Following step 108, in step 109, a test is performed to determine whether the value of the index k has reached the value of the previously fixed integer S. If the response is positive, the transmission sequence is completed. In step 110, the index k is then reset to the value 0 and this is the end of the process. If the response in step 109 is negative, the program loops back to step 101.

If the response in step 107 (i.e., in the test used to determine whether the transmission has been accurately acknowledged) is negative, then another test is performed in step 111. This test compares the acknowledgment word MACK with the value VAL2. If these two values are equal, the program resumes at step 101. In such a case, the transmission has not been accurately acknowledged and the current phase of the message transmission sequence is reiterated. Alternatively, if the response to this test is negative, the variable k is reset to the value 0 in step 112 and the process is resumed at step 102. This corresponds to a reception that is not properly acknowledged and to a resumption of the transmission sequence at the first phase of the sequence.

Figure 6:
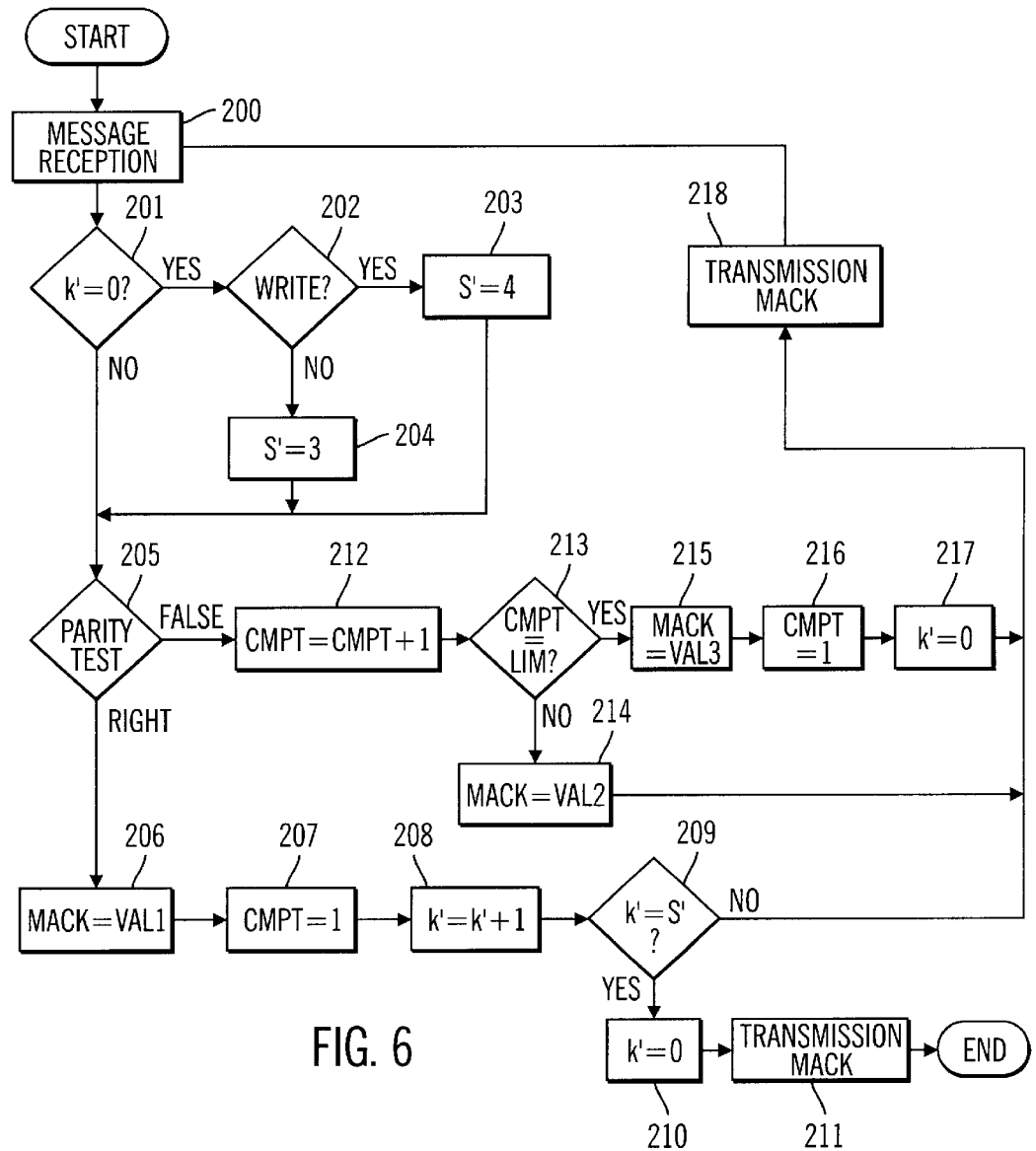
FIG. 6 is a flow chart showing a process for receiving a message according to the preferred embodiment of the present invention.

FIG. 6 shows a flow chart for receiving a message according to a preferred embodiment of the present invention. In this figure, the variables k' and S' are used as natural integers, whose roles are identical to the roles of the variables k and S in FIG. 5. Additionally, a variable CMPT is used in the process of FIG. 6 to enable the counting of the number of successive transmissions of one and the same phase of the sequence for the transmission of a message. Further, a constant LIM is introduced and chosen arbitrarily to enable the number of successive transmissions of one phase of a transmission sequence to be limited to the value assigned to it.

In a first step 200 after the beginning of the program, the message sent by the transmission unit is received. Next, in step 201 a test is performed to find out if the program is in the first phase of the reception sequence (i.e., if k'=0). If the response is yes, then the useful information word is necessarily a control instruction. A test at step 202 then makes it possible, through a decoding of the bits of the useful information word, to determine whether the useful information word corresponds to a write instruction. If the answer is yes, then the natural integer S' assumes the value 4 in step 203. If the answer is no, then the natural integer S' assumes the value 3 in step 204.

At the end of step 204, or at the end of step 202 if the response to the test at step 201 is negative, a parity test 205 is performed. If the result of the parity test 205 proves to be right according to the principles explained above, then step 206 assigns the value VAL1 to the acknowledgment word MACK. Then, in step 207, the variable CMPT is reset to 1. Following step 207, in step 208 the index k' is incremented by one unit, and then a test is performed at step 209 to compare the integers k' and S'. If the values are equal (i.e., if the reception sequence is in its last phase), then the index k' is reset to 0 in step 210 and the right acknowledgment word, whose value is VAL1, is sent in step 211. The end of the process is then reached.

If the parity test at step 205 has revealed a transmission error, the variable CMPT is incremented by one unit in a step 212. Following step 212 a test at step 213 compares the variable CMPT with the constant LIM. If the two values are different, in step 214 the value VAL2 is assigned to the acknowledgment word MACK. Thus, a re-transmission of the last elementary message transmitted is needed. This acknowledgment message is sent in a step 218. On the other hand, if the values of the variables CMPT and LIM are equal, in step 215 the value VAL3 is assigned to the acknowledgment word MACK.

Following step 215, two steps 216 and 217 are used to reset the variable CMPT to the value 1 and the variable k' to the value 0. The sending of the acknowledgment word MACK is then performed in step 218. A re-transmission of the entire message transmission sequence is thus required. Thus, in the event of a transmission that has not been properly acknowledged, the transmission of the last elementary message transmitted is requested a certain number of times before the transmission is resumed at the first elementary message of the current message. In any case, step 218 replaces the performance of a process at step 200 that corresponds to the reception of a phase of the transmission sequence.

Figure 7:
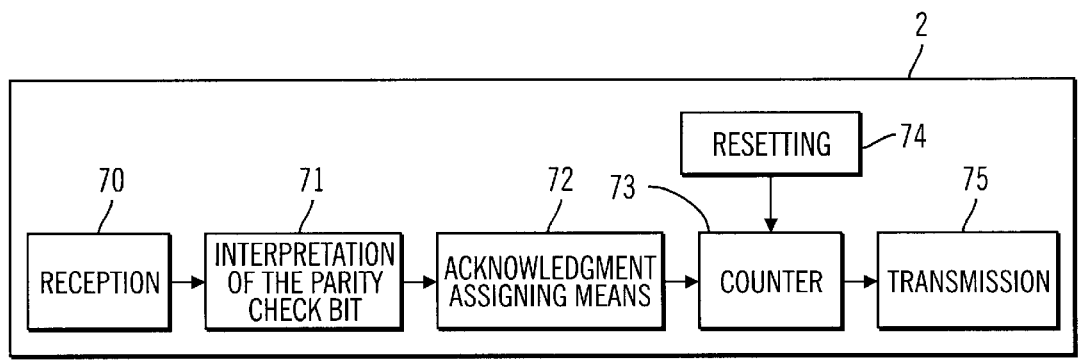
FIG. 7 is a block diagram showing one embodiment of a device for implementing the present invention.

FIG. 7 is a block diagram of one embodiment of a device for implementing the present invention. A slave unit 2 includes a reception unit 70 that receives an elementary message and circuitry 71 that analyzes the coherence of the elementary message received with respect to the value of the parity check bit. This circuitry means 71 can be based on elementary logic gates. Furthermore, an assigning circuit 72 assigns the appropriate reception bit ACK or the appropriate reception word MACK (depending on the message format used). A counter 73 is incremented if a re-transmission is demanded, and can be reset by a resetting circuit 74 after a number of re-transmissions of the same elementary message. Finally, the slave unit 2 includes a transmission unit 75 that sends the reception unit ACK or the appropriate reception word MACK.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, embodiments of the present invention may not include all of the features described above. Therefore, it is intended that the present invention not be limited to the particular embodiments disclosed, but that the invention include all embodiments falling within the scope of the appended claims.

What is claimed is:

1. A method for communicating between a transmitting unit and a receiving unit over a synchronous serial link, the transmitting unit being a master unit and the receiving unit being a slave unit, said method comprising the steps of:

transmitting a message formed by elementary messages from the transmitting master unit to the receiving slave unit over the synchronous serial link, each of the elementary messages including a useful information word;

establishing a time gap composed of a plurality of elementary temporal units after each elementary message is transmitted by the transmitting master unit, the transmitting master unit not transmitting over the synchronous serial link during the time gap; and during the time gap, receiving an acknowledgment word from the receiving slave unit, the acknowledgment word being received by the transmitting master unit via the synchronous serial link, wherein the acknowledgment word includes at least one reception bit, the at least one reception bit being selectively positioned at one of the elementary temporal units of the time gap, and the transmitting master unit determines the elementary message that is to be transmitted next based at least partially on at which elementary temporal unit of the time gap the received at least one reception bit is positioned.

2. The method as defined in claim 1, wherein the acknowledgment word consists of one reception bit, and the elementary temporal unit of the time gap at which the reception bit is positioned indicates the elementary message that is to be transmitted next by the transmitting unit.

3. The method as defined in claim 1, wherein the acknowledgment word consists of one reception bit, and the value of the reception bit and the elementary temporal unit of the time gap at which the reception bit is positioned indicate the elementary message that is to be transmitted next by the transmitting unit.

4. The method as defined in claim 1, further comprising the step of:

if the acknowledgment word indicates that the elementary message was not properly received, re-transmitting the previous elementary message from the transmitting unit to the receiving unit.

5. The method as defined in claim 4, wherein the step of re-transmitting the previous elementary message is repeated up to a predetermined number of times.

6. The method as defined in claim 5, further comprising the step of:

if the step of re-transmitting the previous elementary message is repeated the predetermined number of times and the transmitting unit determines that the elementary message was not properly received, re-transmitting the first elementary message of the message.

7. The method as defined in claim 1, wherein each of the elementary messages further includes a parity check bit.

8. The method as defined in claim 7, further comprising the step of determining at least the value of at least one of the reception bits using at least the parity check bit.

9. A machine-readable medium encoded with a program for communicating between a transmitting unit and a receiving unit over a synchronous serial link, the transmitting unit being a master unit and the receiving unit being a slave unit, said program containing instructions for performing the steps of:

transmitting a message formed by elementary messages from the transmitting master unit to the receiving slave unit over the synchronous serial link, each of the elementary messages including a useful information word;

establishing a time gap composed of a plurality of elementary temporal units after each elementary message is transmitted by the transmitting master unit, the transmitting master unit not transmitting over the synchronous serial link during the time gap; and during the time gap, receiving an acknowledgment word from the receiving slave unit, the acknowledgment word being received by the transmitting master unit via the synchronous serial link, wherein the acknowledgment word includes at least one reception bit, the at least one reception bit being selectively positioned at one of the elementary temporal units of the time gap, and the transmitting master unit determines the elementary message that is to be transmitted next based at least partially on at which elementary temporal unit of the time gap the received at least one reception bit is positioned.

10. The machine-readable medium as defined in claim 9, wherein the acknowledgment word consists of one reception bit, and the elementary temporal unit of the time gap at which the reception bit is positioned indicates the elementary message that is to be transmitted next by the transmitting unit.

11. The machine-readable medium as defined in claim 9, wherein the acknowledgment word consists of one reception bit, and the value of the reception bit and the elementary temporal unit of the time gap at which the reception bit is positioned indicate the elementary message that is to be transmitted next by the transmitting unit.

12. A receiving device for receiving messages from a transmitting device over a synchronous serial link, the receiving device being a slave device and the transmitting device being a master device, said receiving device comprising:

an interface for receiving a transmitted message from the transmitting master device via the synchronous serial link, the message being formed by elementary messages that each include at least one check bit;

means for analyzing a received elementary message to determine if the received elementary message was properly received based on the value of the check bit; and a transmitter for transmitting, during a time gap composed of a plurality of elementary temporal units after an elementary message is transmitted by the transmitting master device, an acknowledgment word to the transmitting master device over the synchronous serial link, wherein the acknowledgment word includes at least one reception bit, the at least one reception bit being selectively positioned at one of the elementary temporal units of the time gap, and the elementary temporal unit of the time gap at which the at least one reception bit is positioned is a function of the elementary message that is to be transmitted next by the transmitting master device.

13. The receiving device as defined in claim 12, wherein the acknowledgment word consists of one reception bit, and the elementary temporal unit of the time gap at which the reception bit is positioned indicates the elementary message that is to be transmitted next by the transmitting master device.

14. The receiving device as defined in claim 12, wherein the acknowledgment word consists of one reception bit, and the value of the reception bit and the elementary temporal unit of the time gap at which the reception bit is positioned indicate the elementary message that is to be transmitted next by the transmitting master device.

15. A method for communicating between a transmitting unit and a receiving unit over a synchronous serial link, the transmitting unit being a master unit and the receiving unit being a slave unit, said method comprising the steps of:

receiving a message from the transmitting master unit at the receiving slave unit via the synchronous serial link, the message being formed by elementary messages that each include a useful information word;

during a time gap composed of a plurality of elementary temporal units after an elementary message is transmitted by the transmitting master unit, transmitting an acknowledgment word from the receiving slave unit to the transmitting master unit over the synchronous serial link, wherein the acknowledgment word includes at least one reception bit, the at least one reception bit being selectively positioned at one of the elementary temporal units of the time gap, and the elementary temporal unit of the time gap at which the at least one reception bit is positioned is a function of the elementary message that is to be transmitted next by the transmitting master unit.

16. The method as defined in claim 15, wherein the acknowledgment word consists of one reception bit, and the elementary temporal unit of the time gap at which the reception bit is positioned indicates the elementary message that is to be transmitted next by the transmitting master unit.

17. The method as defined in claim 15, wherein the acknowledgment word consists of one reception bit, and the value of the reception bit and the elementary temporal unit of the time gap at which the reception bit is positioned indicate the elementary message that is to be transmitted next by the transmitting master unit.

18. The method as defined in claim 15, wherein if the elementary message was not properly received by the receiving slave unit, the acknowledgment word indicates that the transmitting master unit should re-transmit the previous elementary message to the receiving slave unit.

19. The method as defined in claim 18, if the re-transmitting of the previous elementary message has been repeated a predetermined number of times and the elementary message was not properly received by the receiving slave unit, the acknowledgment word indicates that the transmitting master unit should re-transmit the first elementary message of the message.

20. A transmitting device for transmitting messages to a receiving device over a synchronous serial link, the transmitting device being a master device and the receiving device being a slave device, said transmitting master device comprising:

a transmitter for transmitting a message to the receiving slave device over the synchronous serial link, the message being formed by elementary messages that each include at least one check bit;

means for establishing a time gap composed of a plurality of elementary temporal units after each elementary message is transmitted, the transmitter not transmitting over the synchronous serial link during the time gap; and an interface for receiving, during the time gap, an acknowledgment word from the receiving slave device via the synchronous serial link, wherein the acknowledgment word includes at least one reception bit, the at least one reception bit being selectively positioned at one of the elementary temporal units of the time gap, and the transmitting master device determines the elementary message that is to be transmitted next based at least partially on at which elementary temporal unit of the time gap the received at least one reception bit is positioned.

21. The transmitting device as defined in claim 20, wherein the acknowledgment word consists of one reception bit, and the elementary temporal unit of the time gap at which the reception bit is positioned indicates the elementary message that is to be transmitted next by the transmitting master device.

22. The transmitting device as defined in claim 20, wherein the acknowledgment word consists of one reception bit, and the value of the reception bit and the elementary temporal unit of the time gap at which the reception bit is positioned indicate the elementary message that is to be transmitted next by the transmitting master device.

* * * * *